United States Patent [19]

Allen et al.

[11] 4,122,957

[45] Oct. 31, 1978

[54] LIFT TRUCK HAVING HEIGHT INDICATING MEANS

[75] Inventors: Ralph E. Allen; Christian D. Gibson, both of Greene, N.Y.

[73] Assignee: The Raymond Corporation, Greene, N.Y.

[21] Appl. No.: 839,908

[22] Filed: Oct. 6, 1977

[51] Int. Cl.$^2$ .......................... B65G 1/06; G05D 3/08

[52] U.S. Cl. .................................. 214/16.4 A; 340/21

[58] Field of Search ..................... 214/16.4 R, 16.4 A; 187/9 R, 32; 340/267 C, 52 R, 21

[56] References Cited

U.S. PATENT DOCUMENTS

| | | | |
|---|---|---|---|
| 707,305 | 8/1902 | Curlett | 340/21 |
| 972,682 | 10/1910 | Craig | 340/21 |
| 1,057,261 | 3/1913 | Norton | 340/201 R |
| 1,135,014 | 4/1915 | Harding | 340/21 |
| 2,246,921 | 6/1941 | Kummer | 340/21 |
| 3,695,463 | 10/1972 | Weisker et al. | 214/16.4 A |
| 3,796,322 | 3/1974 | Cording | 340/267 C X |
| 3,818,302 | 6/1974 | Rutledge | 214/16.4 A X |
| 4,074,794 | 2/1978 | Scholl | 187/29 A |

*Primary Examiner*—Robert G. Sheridan
*Attorney, Agent, or Firm*—Richard G. Stephens

[57] ABSTRACT

Elevations of a lift truck load carrier relative to shelves of a storage rack are accurately indicated by photosensor means on the load carrier operated by light reflected from reflectors on the storage rack. Raising and lowering the load carrier rotates the shaft of a retractable cable reel. Photosensor signals operate a clutch which connects the reel shaft to rotate a potentiometer over a limited range of heights surrounding the desired load carrier heights for each shelf in a vertical stack of shelves.

19 Claims, 4 Drawing Figures

LIFT TRUCK HAVING HEIGHT INDICATING MEANS

The invention relates to improved hoist control apparatus for lift trucks and like devices. Material handling operations commonly involve deposit and retrieval of loads at or from warehouse racks having vertically stacked shelves, requiring that an operator control a truck hoisting mechanism to lift or lower different loads to specified heights. An attempt to deposit a load which has not been elevated to a proper height can damage the load, or sometimes the rack, and sometimes might seriously endanger the operator. Many modern lift trucks are capable of lifting loads far above elevations where load forks or the like are clearly visible to an operator stationed at the base of a truck, so that deposit and retrieval of loads has been undesirably slowed down and sometimes made unsafe. Increased handling may be accomplished, with improved safety, if improved means are provided to enable an operator to lift loads to designated heights, and provision of such means is a general object of the invention.

While closed-circuit television systems have been provided, using a television camera mounted on a truck load carriage to provide a view from the forks level on a cathode ray tube at the operator's station, such systems have been deemed unsatisfactory, not only because of their substantial cost, but also because the added lighting usually required for effective use of the camera uses electric power which it is desirable to conserve in the case of battery-powered vehicles.

One prior form of shelf height selector which has met with limited success utilizes a lead screw which is rotated by a cable reel as a load carriage is lifted, with the lead screw carrying a traveling nut device which successively operates different switches positioned alongside the lead screw. See U.S. Pat. No. 3,818,302, for example. The switches operated by the leadscrew are connected to control lifting and lowering of the load carriage. A plurality of switches are required for each shelf elevation. Such apparatus has been undesirably expensive and bulky, tedious to adjust to set various shelf heights, and the number of shelf heights which such an assembly can handle is undesirably limited. If one must adjustably position a number of switches along a lead screw to set desired shelf heights, one must either provide a long leadscrew, which results in a bulky assembly, or use a short leadscrew, which requires extremely precise positioning of the switches. One object of the invention is to provide an improved shelf height indicating system which can be built in compact form, and with which tedious adjustments need not be made to establish desired shelf elevations. Furthermore, unless the switches used with the mentioned device are small and difficult to adjust, the number of switches which one can position along a leadscrew of limited length is limited, thereby limiting the number of different shelf heights which can be indicated. Furthermore, the mentioned device does not always provide control of fork elevation with sufficient accuracy relative to the elevations of shelves. It is generally desirable that fork height relative to a shelf surface be known to within a fraction (e.g. one-quarter) of an inch even though various shelves may be distributed over a total lifting range which may be as great as forty feet, so that the accuracy desired tends to be of the order of one part in 2000, or 0.05%. The mentioned prior device is also sometimes disadvantageous in that the leadscrew-operated switches must control lifting and lowering rather than allowing the operator to do so. Various shelf height selection systems heretofore proposed are inherently undesirable because they measure load fork elevation relative to the base frame of the truck which may result in positioning inaccuracies due to tire wear, variations in floor elevation, and variations in shelf surface elevations. One object of the present invention is to provide improved hoist control apparatus for a lift truck which measures fork height relative to rack shelves rather than measuring relative to the floor. By provision of an optical sensor which senses fork level relative to reflectors affixed to the storage racks, the formidable problems associated with measuring relative to the floor are obviated, as are limits on the number of vertically stacked shelves which may be sensed. The provision of a load carriage optical sensor which detects reflective markers affixed to a storage rack is of itself by no means new, such arrangements having been previously proposed for use on stacker cranes, as is shown, for example, in U.S. Pat. Nos. 3,049,247 and 3,119,501. Systems which measure load carriage position relative to storage racks using mechanical feelers or magnetic sensors are also known. The systems ordinarily proposed for use with stacker cranes are generally unsuitable for most rider-operated lift truck systems because they tend to be complex and expensive, usually requiring the use of a digital computer or at least provision of a substantial amount of digital logic, making them impractically expensive to install for some material handling operations. One object of the present invention is to provide improved hoist control apparatus which can be economically justified for use on trucks controlled by a riding operator.

Some important objects of the invention are to provide improved hoist control apparatus which is very economical to install, readily installable on most existing lift trucks for use with most existing racks, and which is reliable. Another object of the invention is to provide a shelf height indicating apparatus which afford an operator an indication of load fork level relative to various shelves as he lifts a load toward or past such shelves, and an indication of the rate of change of that level. Another object of the invention is to provide improved lift truck hoist control apparatus which does not suffer inaccuracy due to mechanical backlash.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 1:
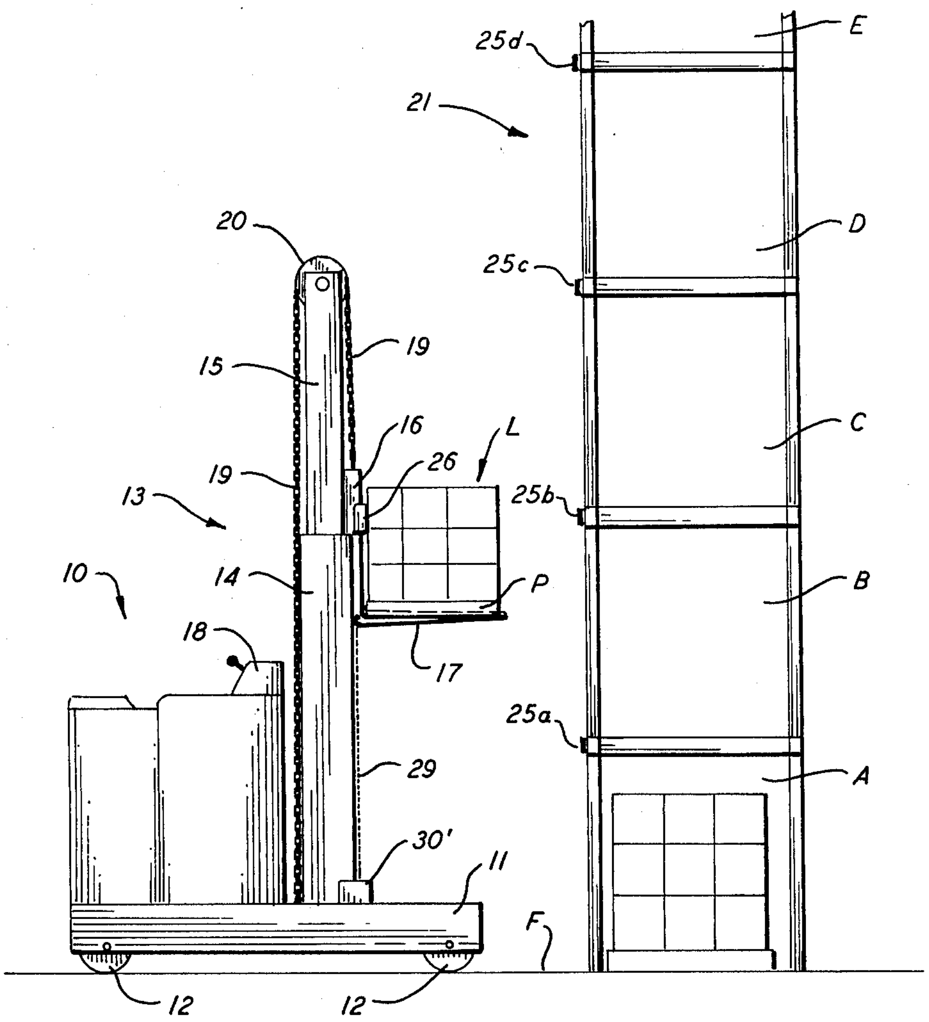
FIG. 1 is a diagrammatic elevation view illustrating a lift truck incorporating the invention stationed beside a warehouse storage rack.

In FIG. 1 a lift truck 10 includes a base frame 11 carried on wheel pairs 12, 12. A mast assembly 13 is shown as including a lower non-elevatable upright section 14, and upwardly extensible upper section 15 and a load carriage 16 having load forks, as at 17, and an operator's station including a control panel 18 and various controls. The load carriage may include a conventional lazy-tongs reach mechanism, or in some trucks the mast may be movable on the truck base to extend the forks. The truck 10 may be completely conventional except as hereinafter described. The truck includes one or more hydraulic rams (not shown) which the operator may control to raise and lower the upper mast section. One or more lift chains 19 extend from load carriage 16 over sheave means 20 carried on the upper mast section and then downwardly to the base frame of the truck, so that lifting and lowering mast section 15 also raises and lowers the load carriage, forks and the load carried on the forks. What is identified as upper mast section 15 may in fact comprise plural extensible sections, as is well known, so that the load forks may be raised a very substantial distance (e.g., 40 feet) above the floor F. In FIG. 1 the load L is shown as a group of boxes carried on a conventional pallet P. A warehouse rack 21 partially shown in FIG. 1 may be completely conventional, and is shown as comprising a plurality of shelves spaced vertically to provide a plurality of bins in compartments A, B, C, D, E, of various heights. Situated on the front or aisle side of the rack, on either a horizontal or vertical rack member extending along and defining the bottom or one side of each bin, is a reflector means. The different reflectors for different shelf heights have been given different designations 25*a*, 25*b*, etc., in FIG. 1. The vertical locations of the reflectors relative to the shelves tends to depend upon the vertical location of a vehicle-carried detector assembly 26 relative to the tips of the load forks. If the reflectors are mounted on horizontally-extending members separating a pair of bins, the detector assembly 26 is preferably mounted on the load carriage 8 to 12 inches above the fork tips. If the detector assembly 26 is situated near the level of the fork tips, each reflector means 25 preferably will be situated on the storage racks some distance, e.g. 8 inches, below the shelf surface with which it is associated. While FIG. 1 shows a reflector associated with each bin except the very lowest, in many installations reflectors will not be deemed necessary for a number of the lowermost bins because they tend to be readily visible to the operator. Each reflector means preferably comprises a short section of reflective tape or paint, or a glass or plastic reflector situated near one lateral edge of a respective bin or compartment, and each reflector is preferably quite retro-reflective, i.e., it will tend to reflect much of its received light back toward the point from which it was received.

In accordance with the present invention, the optical detector assembly 26 affixed to the truck load carriage is arranged to direct a beam of light toward the rack when the truck is positioned facing the rack, and a photosensor arranged to receive light retro-reflected back toward the truck from any one of the reflector means 25 when the photosensor lies at the same elevation as that reflector. The light source preferably has a color (e.g., infra red) distinct from ambient light, and optical filtering may be provided if desired at the source, at the reflectors, or at the photosensor to provide better rejection of ambient light. If desired, the beam of light may be modulated at a known frequency and the output of the photosensor synchronously detected in accordance with well-known techniques. Lenses and aperture stops (not shown) also may be used to discriminate between retro-reflected light from the source and ambient or stray light. While sensor assembly 26 is shown mounted near the back of the load forks, it could be built in the fork tips, if desired, for some applications.

As the load carriage and light beam are lifted or lowered, electrical logic signals are provided from the photosensor assembly each time the light beam impinges on any one of the reflector means. While the reflector means could be mounted at elevations on the storage racks selected relative to the vertical position of the photosensor on the load carriage so that photosensor signals occur when the fork tips lie even with or a predetermined distance above a shelf, it is much preferred to position the reflectors relative to the sensor position on the load carriage so that photosensor signals occur when the fork tips are some distance, e.g. 8 inches, below each shelf surface, during a lifting operation. A flexible electric cable 22 (FIG. 2) extends between assembly 26 and control panel 18 to supply electric power to operate the light source and to route photosensor signals to control equipment to be described, cable 22 ordinarily being trained between the load carriage and truck base in generally the same manner as the lift chains 19.

Figure 2:
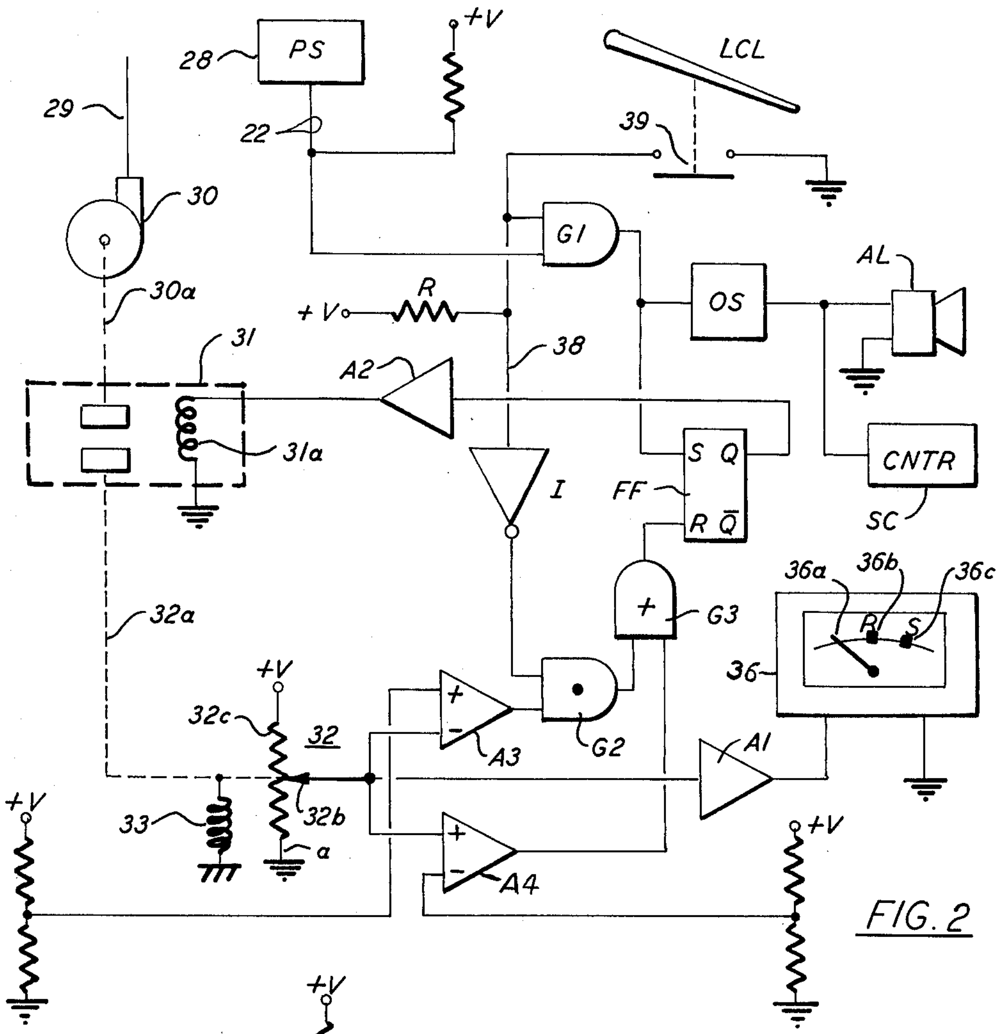
FIG. 2 is an electronic mechanical schematic diagram illustrating one form of the present invention.

A light, flexible wire or cable 29 shown tied at its upper end to carriage 16 extends to a control assembly 30′ shown mounted near the base of the mast. As shown in FIG. 2, wire 29 extends to and is reeled on a spring-operated retractable reel 30, so that wire 29 is payed out from or reeled into reel 30 as the load carriage is lifted or lowered, thereby rotating the shaft 30*a* of reel 30. The shaft 30*a* of reel 30 is connected to one shaft of an electrically controlled clutch 31, the other shaft or half of clutch 31 being connected to the shaft 32*a* of a rotary potentiometer 32. A spring 33 acting on the shaft of the potentiometer 32 urges shaft 32*a* toward a limit position at which the potentiometer wiper arm 32*b* electrically engages grounded end terminal *a* of the potentiometer resistance element 32*c*. A direct voltage (preferably regulated) is connected across the resistance element. Terminal *a* and wiper 32*b* are connected to a d'Arsonval meter or galvanometer 36 mounted on the truck control panel 18 so as to be readily visible to the operator. The voltage on the wiper 32*b* is preferably connected to the meter through a driver amplifier A1, such as a unity-gain voltage-follower operational amplifier. In FIG. 2 photosensor assembly 28 is assumed to comprise a commercially-available photodetector (e.g. Model MCS-625 LED scanner sold by Warner Electric Brake & Clutch Co., Beloit, Wisconsin) operative to provide a "high" or logic 1 signal when it receives substantial light and otherwise to provide a "low" or logic 0 signal. The photodetector output signal applied to one input line of AND gate G1. The other input line 38 of gate G1 is connected to the positive voltage source +V through a resistor R and to switch contacts 39 operated by the operator's lift control lever LCL, so that line 38 is high or logic 1 and gate G1 is conditionally enabled when the operator positions lever LCL to cause lifting of the load carriage. The output signal from gate G1 is applied to the input line of a monostable multivibrator or "one-shot" OS, and to the "set" input line of a bi-stable latch or flip-flop FF. The Q or set output line of the flip-flop is connected to control a clutch driver amplifier A2, the output of which is connected to energize the operating coil 31*a* of clutch 31. Spring means (not shown) maintain the clutch faces disengaged unless coil 31*a* is energized. The output of one-shot OS is shown connected to an audible alarm AL, such as a bell or chime. The wiper arm voltage of potentiometer is also connected to one input line of each of a pair of comparator amplifiers A3 and A4, each of which also receives a respective bias voltage. The output of amplifier A3 is applied to AND gate G2, together with the logic signal from logic inverter I, which is connected to resistor R and switch contacts 39. The outputs of gate G2 and comparator A4 are each connected to OR gate G3, and the output of gate G3 is connected to the reset input line of flip-flop or latch FF.

Assume that a lifting operation is to be performed, that the truck forks are initially on the floor, and that latch FF is cleared or reset, so that clutch 31 is disengaged. Spring 33 will hold the wiper of the potentiometer at terminal *a*, and zero deflection of the meter needle 36*a* will occur. As the forks raise from the floor, the photosensor assembly 28 will not receive reflected light until it reaches the level of the lower edge of reflector 25*a*, and before it reaches that level the latch will remain cleared, the clutch will remain disengaged even though raising of the carriage will be paying out wire 29 from reel 30 and the reel shaft 30*a* will be rotating, and the meter will continue to read zero. As the photosensor reaches the level of reflector 25*a*, the light reflected onto photosensor 28 will enable gate G1 and set the latch, engaging the clutch. Then as the carriage continues to rise, raising the forks above the level of reflector 25*a*, the reel rotation will move the wiper arm, upwardly in FIG. 2, applying an increasing voltage to voltmeter 36. The meter deflection is related to carriage vertical movement such that the meter needle will reach a first index mark 36*b* when the forks are at the proper level to enter a pallet (not shown) stored in compartment B, and will reach a second scale mark 36*c* when the forks are at a slightly higher level, e.g. about 4 inches higher, deemed proper when the forks are to extend a load into compartment B before setting it down. Thus by observing meter 36 the truck operator is apprised of the fork level and readily enabled to terminate lifting at the desired point for either storing a load in or retrieving a load from compartment B. Arranging the vertical position of the reflectors so that a meter deflection begins while the forks are substantially below the ultimate storage or retrieval fork elevation which the operator will desire will be seen to warn the operator, and provide an indication of the rate at which forks are approaching the desired elevation, allowing him to anticipate arrival at that elevation and take corrective action, if necessary, so that he can hoist the forks to the desired elevation without overshoot and usually without repeated inching or jogging operations, which is an important feature of the invention. The Q or set output of latch FF will rise and the Q output will lower when the latch is set. Either of those voltages may be used to control a truck reach mechanism, so that the forks cannot be extended unless the latch is set. Several sets of index marks, preferably colored differently, may be provided on meter 36, if desired, for use with different types of pallets, and the positions of the index marks on the face of the meter may be made adjustable, if desired.

The rotation of potentiometer 32 is preferably related to carriage travel so that full rotation of the potentiometer across its entire resistance element occurs as the forks raise only from about 8 inches below the level of a shelf surface to a level about 8 inches above the desired fork level for extending a load into a rack compartment, perhaps a vertical range of 20 inches in typical applications. With full potentiometer travel and full-scale meter deflections occurring over such a limited amount of carriage vertical movement, potentiometer resolution limitations and meter needle reading errors (due to parallax, for example) become negligible, so that the forks can be readily positioned by the operator to within a small fraction of an inch if he should so desire, which is a very important feature of the invention.

If potentiometer 32 is a conventional rotary potentiometer having about 360° full rotation, that amount of rotation may be obtained over carriage travel of 20 inches, without provision of any gearing between reel 30 and the potentiometer if the internal spool of reel 30 has a diameter of about 6.38 inches. Thus it will be apparent that reel 30 need not consume appreciable space. It will be readily apparent that if wire 29 is reasonably thin, a long length (e.g. 40 feet) of such wire may be readily reeled in and out of reel 30 without materially affecting the effective diameter of the reel, and the retractable reel may be provided with conventional level-winding means to obviate or minimize any change in effective diameter.

In the simple system shown in FIG. 2, the voltage applied to the meter is also applied to switch comparator A4 when the forks begin to raise more than say 20 inches above a reflector, the interception of which has caused clutch engagement. When the photosensor is less than a predetermined distance such as 20 inches above a reflector so that the wiper arm voltage lies below a predetermined value, the bias voltage applied to comparator A4 provides a negative or logic 0 output from amplifier A4, which allows the output of OR gate G3 to remain low. If the operator raises the forks more than the predetermined distance (assumed to be 20 inches) above a reflector, the comparator A4 output swings positive, applying a logic 1 output through gate G3, clearing or resetting the latch, thereby de-energizing clutch 31, whereupon spring 33 rapidly returns potentiometer 32 to its lowermost (in FIG. 2) position, and the meter deflection returns to zero.

With the system shown in FIG. 2, it will be seen that when continuous lifting occurs past several reflector levels, the meter needle will deflect gradually upwardly from zero as each reflector is reached and passed and then drop back to zero as the forks reach a predetermined height above each reflector or shelf height. Inasmuch as the potentiometer-meter system is reset at zero in such a manner as successive shelves are passed, it will be seen that the number of vertically stacked shelves which may be sensed is unlimited, which is an important feature of the invention. Also, while switch LCL is preferably arranged as shown to allow setting of the latch and an engaging of the clutch only while lifting is occurring, which serves to decrease wear, it is important to note that once a shelf is sensed during a lifting operation and the latch is set, the meter will remain operative unless the operator so grossly overshoots the proper shelf positions as to cause switching of comparator A4, or unless he lowers the carriage back down far enough to switch comparator A3 and clear the latch.

Thus once latch FF is set, the meter remains operative as either lifting or lowering movements are made within about a 20-inch range, providing the operator with an indication of fork level if he does overshoot or undershoot the desired position. The bias signal applied to comparator A3 causes a negative or logic 0 output from that comparator whenever the potentiometer wiper voltage exceeds some predetermined small value, but if the operator lowers the carriage sufficiently when the clutch is engaged so that the wiper arm voltage becomes sufficiently small, comparator A3 applies a high or logic 1 voltage to AND gate G2, and with the lift control lever LCL then in the lowering position, gate G2 will be enabled, applying a logic 1 signal to AND gate G2, while the potentiometer wiper voltage is zero. Before the latch is set and the clutch is engaged, the A3 comparator output does not prevent the latch from setting to engage the clutch when lifting is occurring, since the low voltage from inverter I will then keep gate G2 disabled. The two bias voltages applied to comparators can be made adjustable, of course, by substituting potentiometers for the two voltage dividers shown. It is important to recognize that the particular logic circuit shown is exemplary only, and that those skilled in the art will be readily enabled as a result of this disclosure to devise a wide variety of different circuits which provide the same functions. A thyristor, for example, can be used in lieu of the flip-flop shown, with simple modifications to the circuit. While voltage comparators are shown utilized to cause disconnection of the clutch, it will become apparent that a cam (not shown) carried on shaft 32*a* could instead be used to operate two switches (not shown) to similarly clear the latch, one such switch applying logic 1 to the clear input whenever the potentiometer wiper approached its upper terminal, and the other applying logic 1 to the clear input whenever the wiper approached or was located at the grounded terminal *a* unless lever LCL was in its lifting position.

The operator can readily determine which shelf the forks are passing or approaching by merely counting the number of those deflections of the meter needle, and each setting one-shot OS or latch FF or each logic 1 output from gate G1 may be arranged, if desired, to operate a counter such as counter SC visible to the operator, although the operator ordinarily can see the shelves clearly enough to count them, so that he usually need not count meter deflections.

Figure 3:
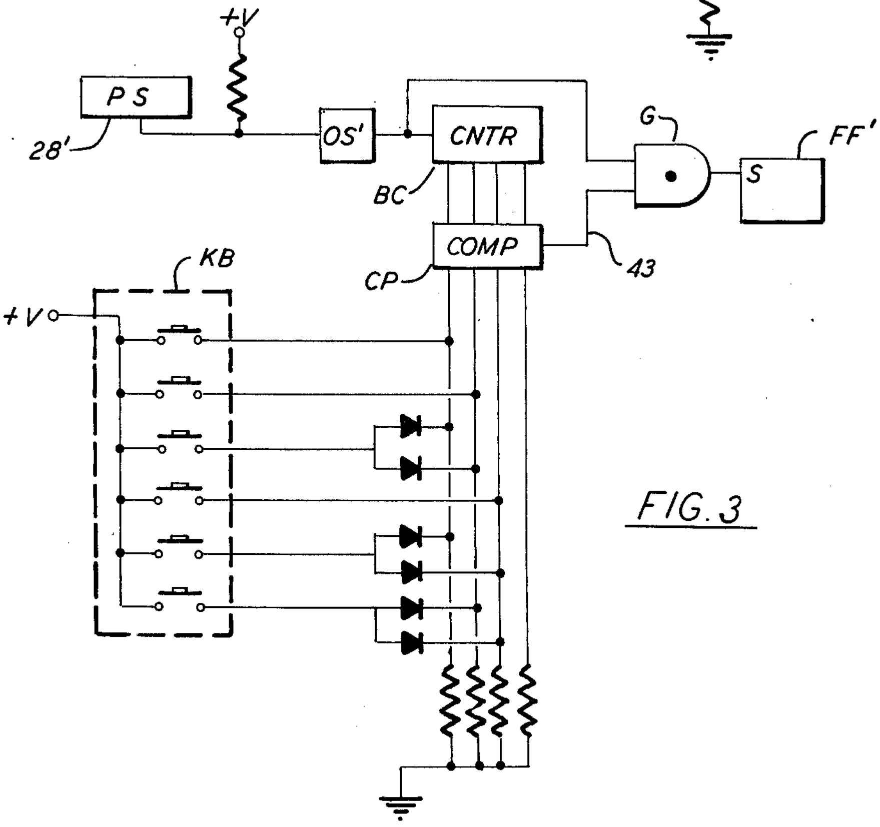
FIG. 3 is a schematic diagram illustrating a modification which may be made to the apparatus of FIG. 1.

While the arrangement shown in FIG. 2 is suitable for many applications, it becomes desirable in some applications to minimize wear of potentiometer 32 and clutch 31, and often becomes desirable that an operator not have to count shelves or meter deflections or even observe the advancement of a counter. In FIG. 3 the photosensor 28′ is connected to temporarily set monostable multivibrator or one-shot OS′ each time light is received from a reflector 25, and each triggering of the one-shot advances binary counter BC one count. The output lines of counter BC are connected to a 4-bit comparator CP, to compare the number in counter BC with the number of a desired shelf which has been selected by the operator by means of keyboard KB, wherein six pushbutton switches shown are assumed to be mechanically interlocked so that only one of them can be closed at any one time. As a lifting sequence occurs, the output line 43 from the comparator remains low until the selected shelf level is reached, and then AND gate G is enabled, providing an output to set latch FF′ which may be connected to operate clutch 31, potentiometer 32 and meter 36 in the same manner as in FIG. 2.

Figure 4:
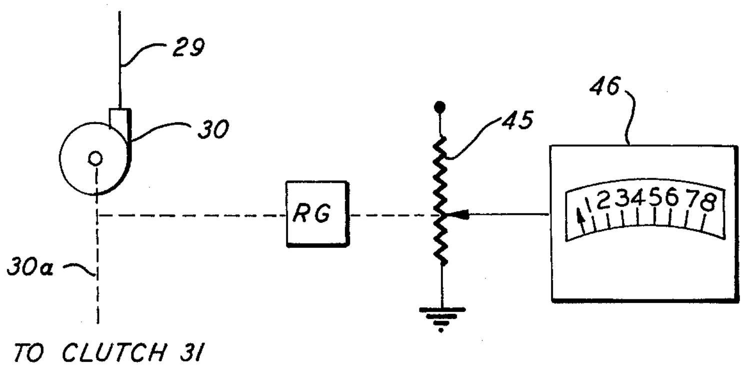
FIG. 4 is a schematic diagram illustrating one assembly which may be added to the apparatus shown in FIG. 2.

As is illustrated in FIG. 4, the shaft 30*a* of retractable reel 30 also may be connected to operate a second potentiometer 45, so as to move the wiper of that potentiometer over its resistance range as the load carriage is raised or lowered over its entire range. Potentiometer 45 ordinarily will comprise a multi-turn potentiometer, though a standard "single-turn" potentiometer could be used together with reduction gearing, which is shown in block form at RG. The output voltage from potentiometer 45 is shown connected to operate a second meter 46 having dial markings representing each shelf in a vertical stack of shelves. The use of meter 46 affords the operator a rough indication of carriage height, making operator shelf-counting and the use of a counter such as SC in FIG. 2 unnecessary. Meter 46 is preferably mounted adjacent meter 36 on control panel 18 in ready view of the operator. While the invention has been illustrated using a conventional galvanometer or voltmeter as its indicating instrument, various other forms of electrically-operated analog indicators can be substituted without departing from the invention. Some other forms of electrical impedance element could be substituted for the rotary potentiometers shown. While a single photosensor element has been shown, it will become apparent that the photosensor system could include plural photosensors operating from either the same reflector or plural reflectors at a given shelf location, with the plural photosensors both required to be operated in order to operate the meter. Such an arrangement can reduce the likelihood of false operation from stray or ambient light, and can be used to require more precise alignment of the vehicle with the rack if such a requirement should be desired. While photosensor means are shown and much preferred, it will become apparent that some basic principles of the invention could be used using mechanical feelers or magnetic sensors in lieu of photosensors. Further, while a light source will be carried on the vehicle in the photodetector assembly 26 in most applications of the invention, it will be apparent that the reflectors carried on the storage rack could be arranged to reflect other lighting, such as ceiling lighting, in directions such that the reflected light was sensed only when the load carriage was at desired elevations, and indeed, light sources could be substituted for reflectors in some special applications of the invention, although wiring to energize separate such sources would be deemed wasteful in most applications.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. In a material storage and retrieval system having at least one column of storage compartments and a plurality of sensed objects affixed to said column at different respective elevations, and a rider-controlled lift truck having an operator station, a load carriage and hoist means controllable from said operator station for lifting and lowering said load carriage relative to said operator station, the combination of: sensing means carried on said load carriage and operable to provide a first signal upon movement of said sensing means to a predetermined elevation relative to any of said sensed objects; reel means having a first shaft and a cable, said cable being connected to be payed in and out from said reel means in proportion to the lifting and lowering of said load carriage and being operable to rotate said first shaft; a variable electrical impedance element having a second shaft and being operable to provide a varying impedance proportional to rotation of said second shaft; an electric indicator located at said operator station and connected to said variable impedance element to provide a varying indication upon roatation of said second shaft; clutch means operable to mechanically interconnect and disconnect said first and second shafts; and control circuit means responsive to at least one of said first signals from said sensing means for engaging said clutch means to interconnect said shafts.

2. The system according to claim 1 where each of said sensed objects comprises a light reflector and said sensing means comprises a photosensor operated by light received from any of said reflectors.

3. The system according to claim 1 having means for automatically rotating said second shaft to a reference position when said clutch means disconnects said first and second shafts.

4. The system according to claim 1 wherein said indicator comprises a galvanometer having first and second scale markings indicating predetermined vertical height relationships between said load carriage and any of said sensed objects.

5. The system according to claim 1 wherein said control circuit means includes means responsive to rotation of said second shaft for operating said clutch means to disengage said shafts.

6. The system according to claim 1 wherein said variable electrical impedance element comprises a rotary potentiometer.

7. The system according to claim 1 wherein said control circuit means includes a storage element connected to be latched by said one of said first signals to cause engagement of said clutch means.

8. The system according to claim 1 wherein said control circuit means includes an operator lifting and lowering control operable between lifting and lowering positions, and means for causing said one of said first signals to cause engagement of said clutch means only when said operator control is in said lifting position.

9. The system according to claim 1 having count-indicating means visible to an operator at said operator station for indicating a count of said first signals.

10. The system according to claim 1 having a second variable electrical impedance element connected to be varied by rotation of said first shaft, and a second electric indicator connected to be operated by said second variable electrical impedance element.

11. The system according to claim 1 having an audible indicator and means responsive to said one of said first signals for temporarily sounding said audible indicator.

12. The system according to claim 1 wherein said control circuit means includes counter means for counting said first signals to provide second signals; selective switching means located at said operator station and operable by an operator to provide third signals representing desired compartments of said column, and gating circuit means responsive to said second signals and said third signals for operating said clutch means to engage said first and second shafts.

13. The system according to claim 1 wherein said control circuit means comprises counter means for counting said first signal, operator-controlled switching means for selecting desired counts, and comparison means responsive to said counter means and said operator-controlled switching means for providing output signals for engaging said clutch means.

14. The system according to claim 2 having a light source carried on said load carriage and arranged to direct light toward said reflectors.

15. The system according to claim 7 having means to unlatch said storage means to cause disconnection of said shafts upon rotation of said second shaft beyond a predetermined amount in a first direction.

16. The system according to claim 7 having means to unlatch said storage means upon rotation of said second shaft outside a pair of upper and lower limits.

17. Apparatus for indicating the height of a lift truck load carriage relative to any of a plurality of reflective markers located at a plurality of different heights, comprising, in combination: photosensor means carried on said carriage and operative to provide an output signal whenever said carriage has a predetermined vertical relationship to any of said reflective markers; reel means having a cable connected to said carriage and operative to provide a shaft rotation commensurate with lifting and lowering of said carriage; an indicator means carried on said lift truck; a variable electrical device connected to operate said indicator means; clutch means responsive to at least one of said output signals for connecting said shaft rotation to vary said electrical device; means responsive to a predetermined variation of said electrical device for disengaging said clutch means; and means operable upon disengagement of said clutch means for returning said electrical device to a reference condition.

18. Apparatus according to claim 17 having latch means set by said one of said output signals for providing a signal to control said clutch means, whereby said shaft rotation will continue to be applied to said electrical device if said carriage is raised above said predetermined vertical relationship.

19. Apparatus according to claim 17 wherein said electrical device is connected to operate said indicator means over its full scale with a shaft rotation less than that occurring during vertical travel of said carriage through a distance equal to that between successive adjacent pairs of said reflective markers.

* * * * *